Inventor:
Kurt Laas.
By [signature] Atty.

Feb. 19, 1963 K. LAAS 3,078,347

PLURAL SERVICE TELEPHONE CONNECTORS CONTROLLED BY COMMON MARKERS

Filed Aug. 18, 1959 6 Sheets-Sheet 2

Inventor.
Kurt Laas.
By [signature] Atty

Feb. 19, 1963

K. LAAS

PLURAL SERVICE TELEPHONE CONNECTORS CONTROLLED BY COMMON MARKERS 3,078,347

Filed Aug. 18, 1959

6 Sheets-Sheet 3

Inventor:
Kurt Laas
By [signature] Atty

Feb. 19, 1963

K. LAAS

PLURAL SERVICE TELEPHONE CONNECTORS
CONTROLLED BY COMMON MARKERS 3,078,347

Filed Aug. 18, 1959

6 Sheets-Sheet 4

Inventor:
Kurt Laas.
By [signature] Atty

Inventor:
Kurt Laas.
By [signature] Atty.

Feb. 19, 1963 K. LAAS 3,078,347

PLURAL SERVICE TELEPHONE CONNECTORS CONTROLLED BY COMMON MARKERS

Filed Aug. 18, 1959 6 Sheets-Sheet 6

Inventor:
Kurt Laas.
By. [signature] Atty

United States Patent Office 3,078,347
Patented Feb. 19, 1963

3,078,347

PLURAL SERVICE TELEPHONE CONNECTORS CONTROLLED BY COMMON MARKERS

Kurt Laas, Munich, Germany, assignor to Siemens & Halske Aktiengesellschaft Berlin and Munich, a corporation of Germany Filed Aug. 18, 1959, Ser. No. 834,446
Claims priority, application Germany Aug. 20, 1958
8 Claims. (Cl. 179—18)

Figures 1, 2:
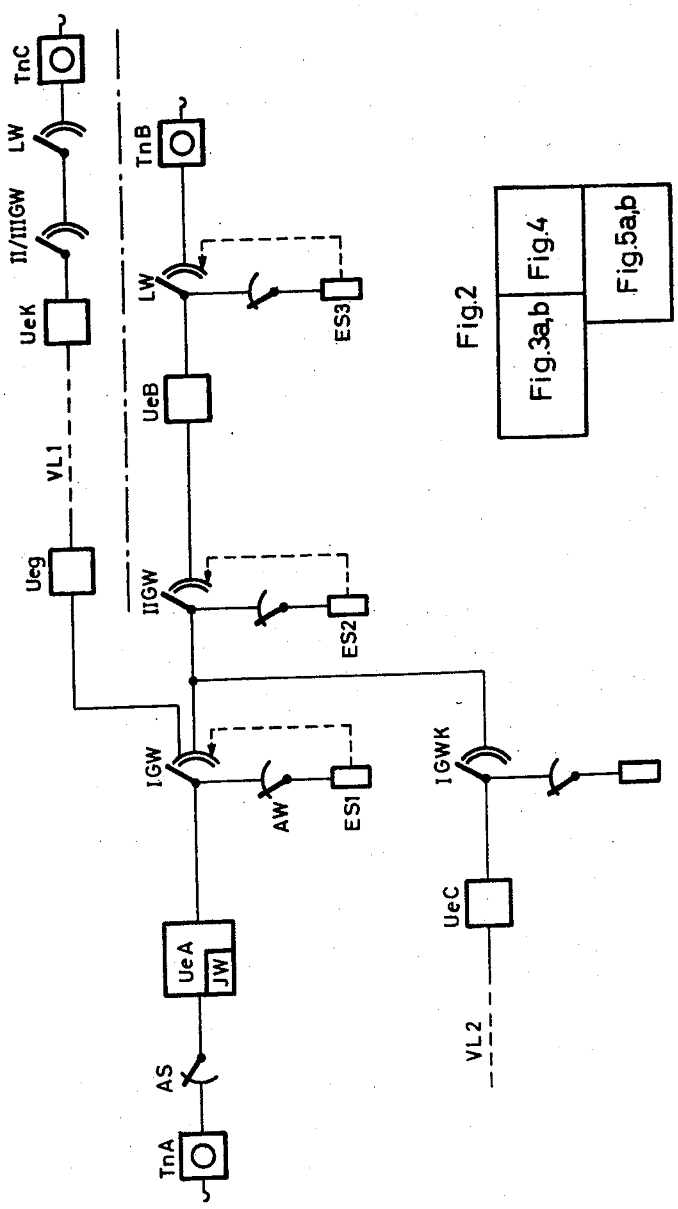

This invention relates to a telephone system having switches in the various selection stages, governed by setting or marker devices which are respectively common to a plurality of switches in predetermined selection stages, and is particularly concerned with a circuit arrangement for controlling the operation of plural service connector switches having access to individual lines, private branch exchange lines and party lines, the operation of said connector switches being governed by marker devices which are respectively common to a plurality of connector switches.

The marker devices receive in known manner the selection impulse series (digits) corresponding to called subscriber stations or lines and utilize such series by means of a counting chain for placing a characteristic marker potential on a predetermined marker line or conductor, whereupon the corresponding switch is operatively controlled so as to effect setting of its wipers in engagement with the bank contacts of the marked trunk or line.

The switches used in the system are preferably rotary switches with individual drive means, for example, motor operated switches; however, the invention may also be used in connection with other switches, for example, vertical-rotary switches with stepping drive means, relay switches, and the like.

As mentioned before, the invention is particularly concerned with the connector stage of such a telephone system. The connector switches are to have access to individual lines, private branch exchange lines comprising a plurality of extensions reached respectively by a connector in the course of a hunting operation subsequent to setting thereof responsive to the final digit of the corresponding private branch subscriber, and, finally, having also access to party lines.

A party line may have up to ten subscribers connected thereto which are respectively accessible to a connector over bank contacts individual to the respective party lines. These bank contacts are multiplied in the connector contact banks according to the corresponding line conductors and the individual private conductors. The ringing of party line subscriber stations is effected by coded frequencies, for example, five frequencies combined in different codes. The connector is completely free of relays.

All functions of the respective connectors, which are required for extending and effecting connections, such as testing of the selected lines, transmission of busy tone, ringing, battery feed to the calling and called parties, are governed by transmission devices respectively disposed in the connection path separate from and preceding a connector over which a call is being extended. The operation of the corresponding transmission device, just as that of the respective connector, is governed by the marker device.

The problem underlying the invention is to instantly ring individual lines and private branch exchange lines as soon as the connector has ascertained that the corresponding line is idle, such ringing to be effected by the socalled first ring, and to provide for unmutilated transmission of coded ringing to party lines. It was impossible until now, due to the requirement of effecting time-correct start of the coded frequency ringing of party lines, to utilize the first ring for other types of services. The use of the first ring is however desirable, for example, because of the advantage resulting therefrom that an exchange line seized in the case of a branch exchange connection can be immediately busied to other calls.

The invention seeks to solve this problem for connectors which are operatively controlled by marker devices, by the provision of a circuit arrangement which is as simple and economically as advantageous as possible. The corresponding circuit arrangement shall also make it possible to distribute party line subscribers as desired over the entire connector contact bank, thus departing from the necessity of placing them in a strictly predetermined group of bank contacts, for example, in a predetermined decade.

In accordance with the invention, the problem is solved by the provision of switching means for differently marking, by way of the connector contact bank over which the marking of the desired line is effected by the marker device employed, also the kind of the desired connection (individual line or branch exchange line or party line), such switching means transmitting to the preceding relay set (transmission device) a criterion corresponding to the kind or type of connection involved.

In accordance with a further feature of the invention, the different line-type criteria are extended rearwardly to the preceding transmission device in the form of current stages by way of one and the same wiper of the interconnecting switch which connects the marker device to the connection path employed. The advantage resulting therefrom is that the expenditure for producing the different criteria can be held at a minimum and that only one wiper of the interconnecting switch suffices for the transmission of different criteria.

Figure 3A:
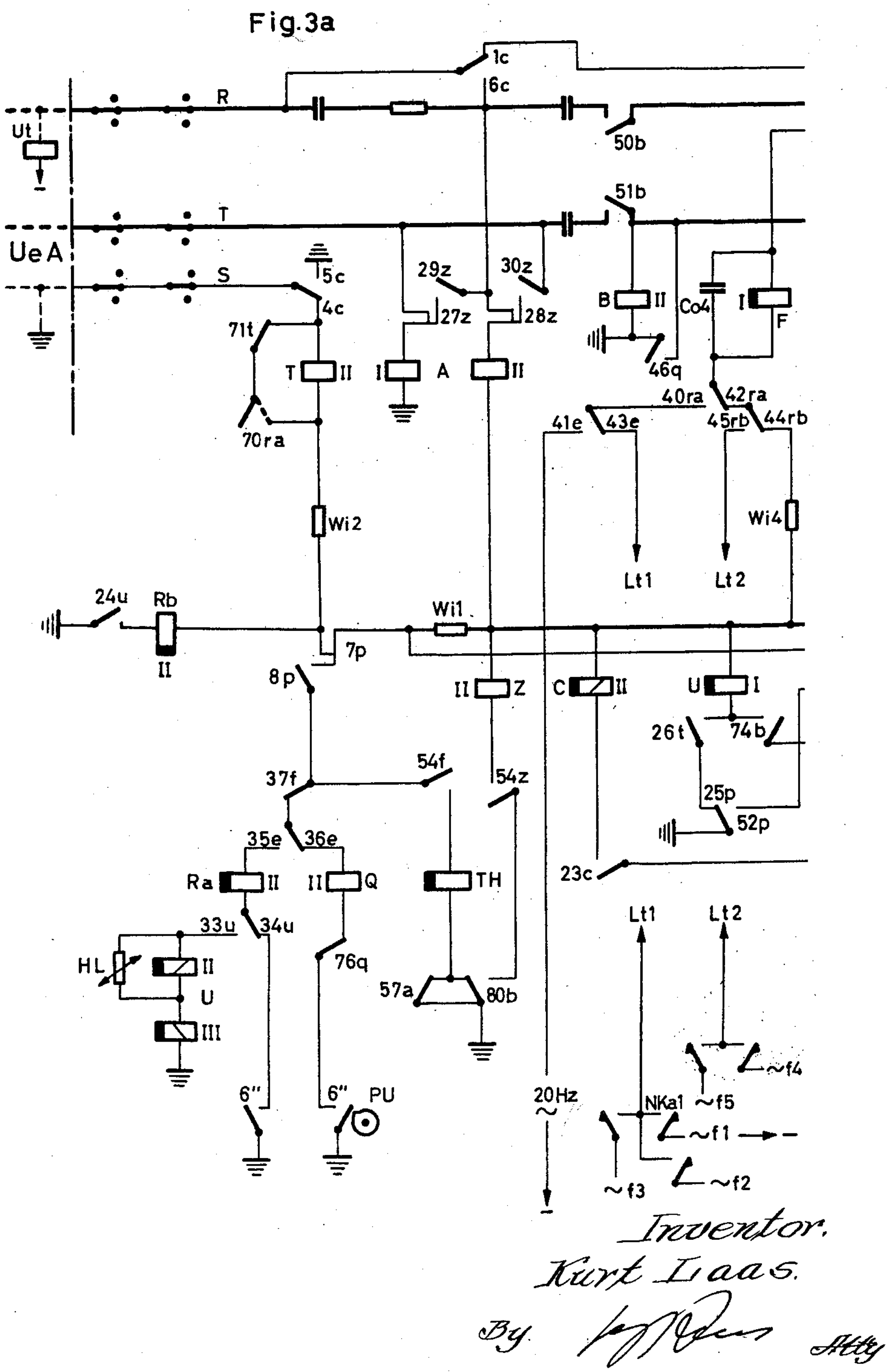
Figure 3B:
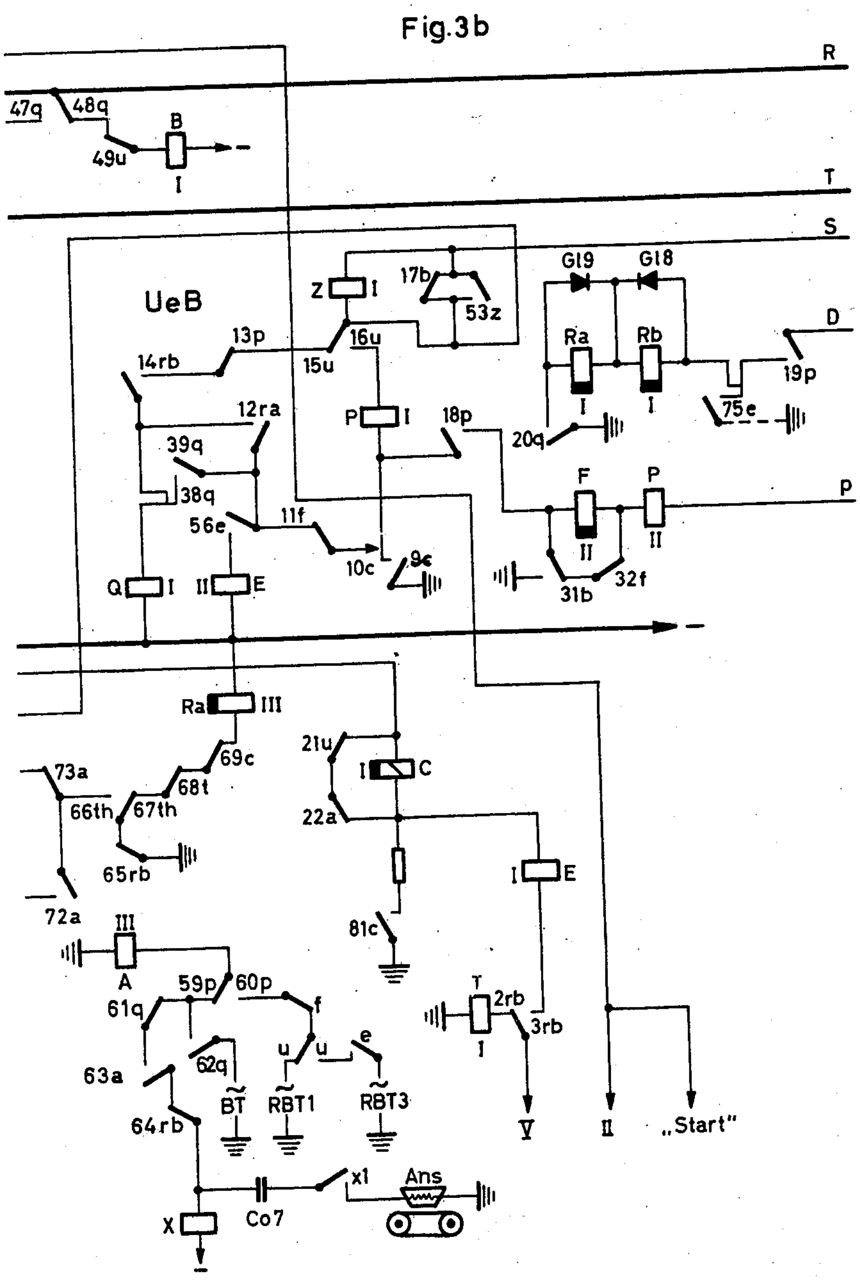
Figure 4:
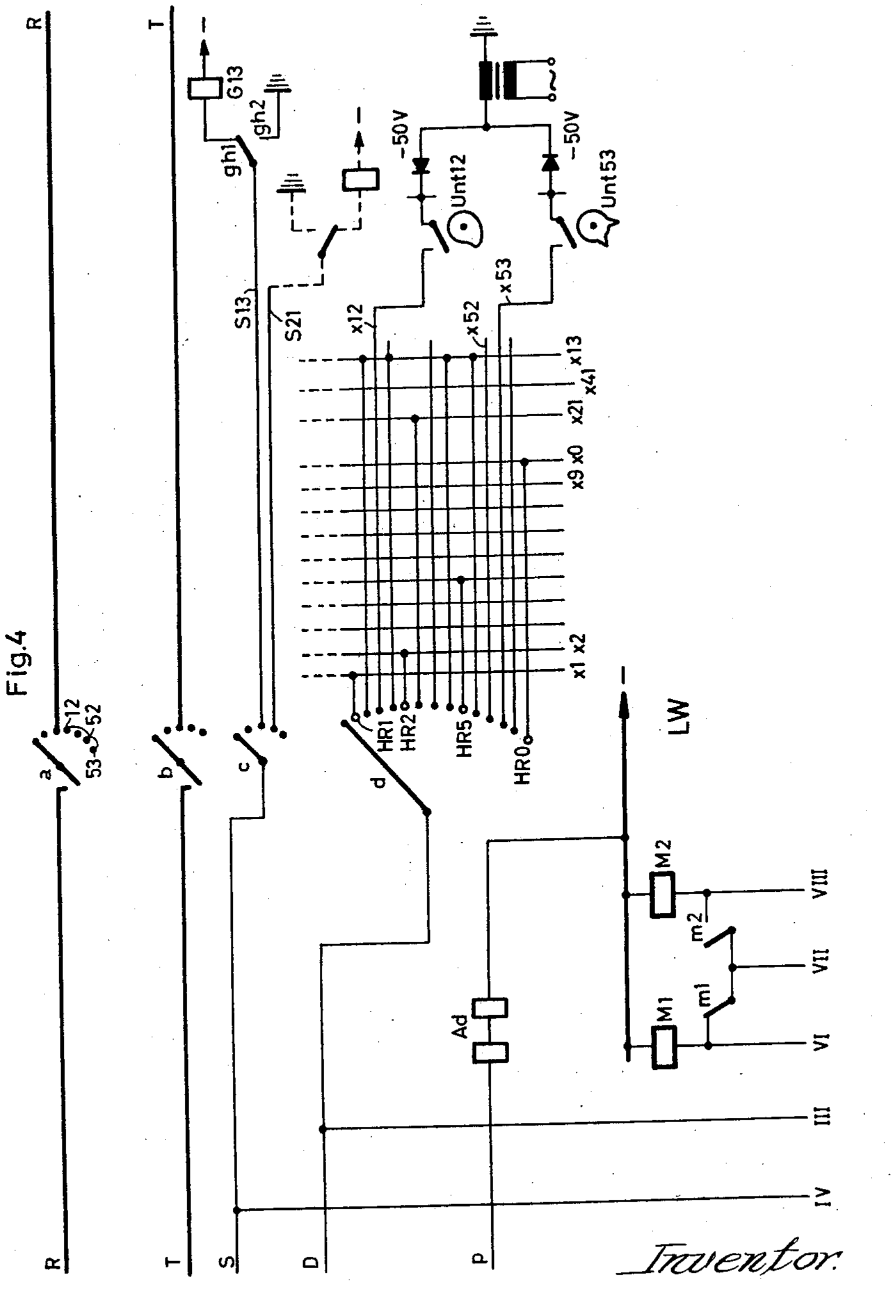

The various objects and features of the invention will appear in the course of the description of an embodiment which will be rendered below with reference to the accompanying drawings. In the drawings, FIG. 1 is a block circuit diagram showing the connection devices required for the extension of calls;

FIG. 2 shows how the various figures are to be mutually aligned for tracing circuits;

FIGS. 3*a* and 3*b*, placed side by side with interconnecting conductors in alignment, illustrate details of a transmission device (UeB; FIG. 1) preceding a connector (LW in FIG. 1);

FIG. 4 is a connector circuit; and

Figure 5A:
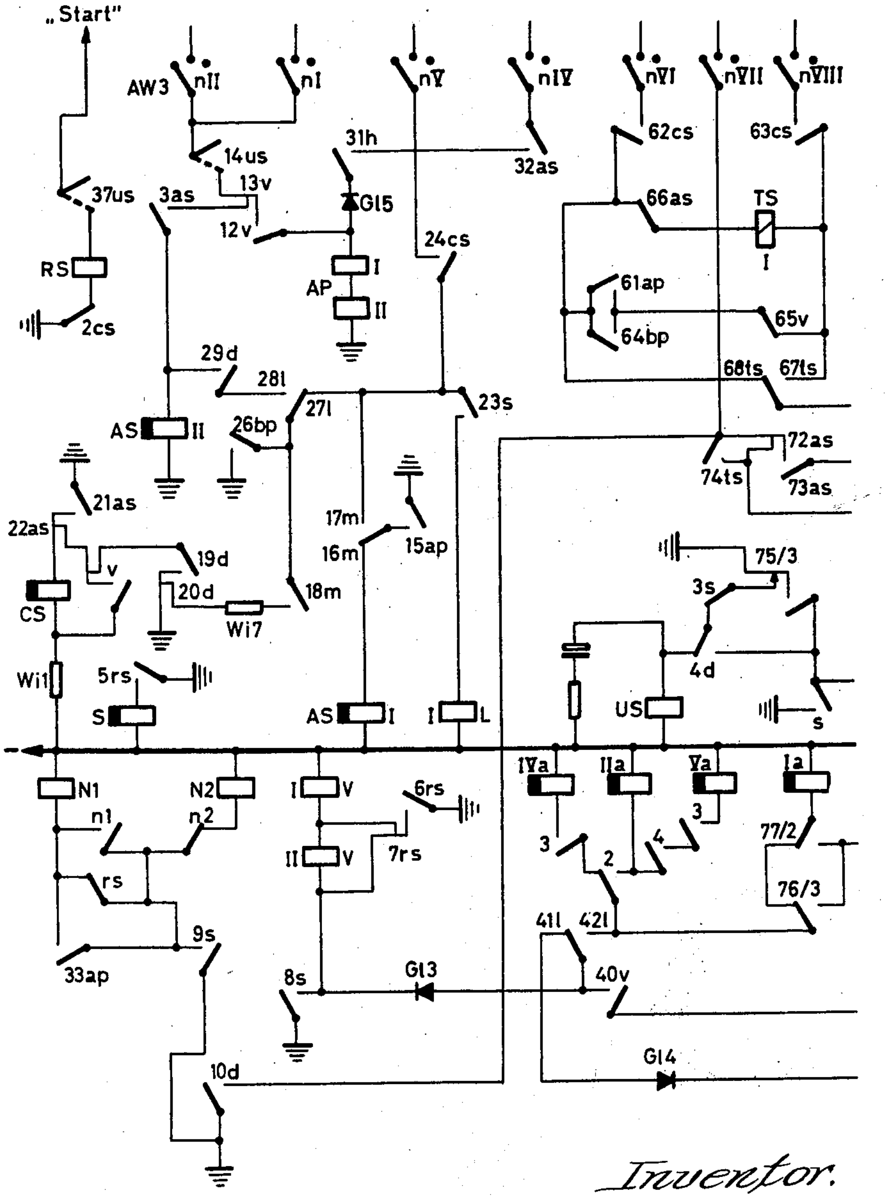
Figure 5B:
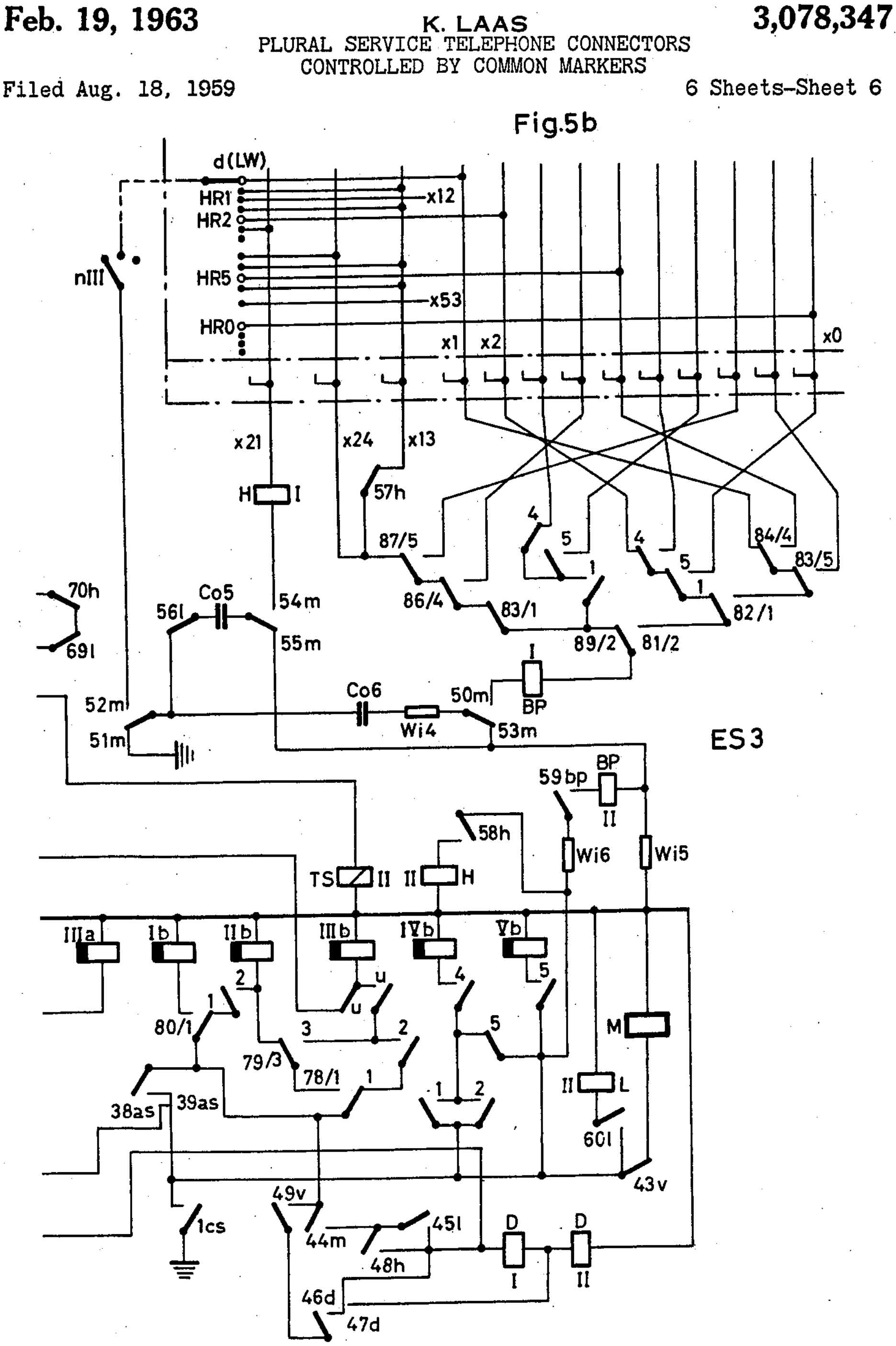

FIGS. 5*a* and 5*b*, placed side by side with interconnecting conductors in alignment, represent circuits for the interconnecting switch (AW3; FIG. 1) and for the marker (ES3; FIG. 1).

Referring now to FIG. 1, a call between subscriber lines or stations T*n*A and T*n*B, assumed to be connected to the same exchange, is extended by way of a call finder AS which is fixedly coupled with a first group selector IGW. A transmission device U*e*A containing an electromechanical impulse repeater JW functioning as a switch-through storer for receiving and retransmitting selection current impulse series, is fixedly disposed between the call finder AS and the first group selector IGW. The impulse repeater receives the impulse series and retransmits them without recaculation. The transmission device U*e*A, upon being placed in operation, or responsive to the receipt of the first impulse of an impulse series or, if desired, responsive to the receipt of the entire first impulse series, transmits a demand criterion for one of the centrally located marker devices such as ES1. The marker ES1 of the first group selector IWG now becomes connected to the connection path by means of an interconnecting switch AW1. The demand for the marker is signified by the connection, in the transmission device U*e*A, for example, responsive to receipt of the first current impulse of an impulse series, of a predetermined potential to a line conductor, for starting the operation of the interconnecting switch AW1 by way of a start conductor.

The transmission of the first impulse series from the impulse repeater JW is effected after connection of the marker ES1 to the connection path involved. This impulse series is received in the marker and evaluated therein in a marker field for the control of the first group selector in setting its wipers in engagement with the bank contacts of an idle trunk. After extension of the connection by the first group selector, to an idle second group selector IIGW, the marker ES2 of the corresponding selector stage is again triggered by a potential from the transmission device U*e*A, so as to effect connection thereof to the connection path involved. The corresponding marker ES2 thereupon causes the impulse repeater JW in the transmission device U*e*A to transmit the second series of impulses. The marker ES2 receives this impulse series and marks in the second group selector the desired trunk group, whereupon the marker is again released.

The second group selector IIGW is now actuated to set its wipers in engagement with bank contacts of an idle trunk, in the marked trunk group, leading to a connector LW. In this trunk is disposed a transmission device U*e*B which is individual to the corresponding connector. After the second group selector IIGW has set its wipers in engagement with the bank contacts of an idle connector, assumed to be the connector LW, a line conductor will be connected through to a start conductor of the marker ES3 serving the connector. Connected to this line conductor is again the triggering potential from the transmission device U*e*A, such potential causing the interconnecting switch AW3 to operate and to establish connection with the connection path.

As soon as the marker ES3 is connected to the line of the connection path, a criterion is transmitted rearwardly to the transmission device U*e*A so as to cause transmission therefrom of the penultimate current impulse series (tens digit). This impulse series is received in the marker ES3 and evaluated with respect to a predetermined marker line so as to cause the connector to start operating for the purpose of setting its wipers with respect to bank contacts of the line group containing the desired subscriber line. The marker ES3 is thereupon released, but a criterion is stored in the transmission device, signifying that the tens digit for the setting of the connector had been received. The line conductor which is switched through again carries the start potential which had been connected at the transmission device U*e*A. The interconnecting switch AW3 either is still connected to the connection path involved or is triggered anew by the start criterion so as to establish connection therewith, thereby reconnecting the setting device ES3 with the connection path. After the marker ES3 is thus connected to the connection path, a signal is transmitted rearwardly to the transmission device U*e*A, causing transmission therefrom by the impulse repeater JW, of the last impulse series (units digit). The marker does not evaluate this digit with respect to a predetermined marker line but is used for controlling the connector stepwise to set its wipers into engagement with the bank contacts of the desired line.

The transmission device U*e*B which precedes the connector LW serves for carrying out all functions which are customarily effected by the connector. It also supplies battery feed for the calling and for the called subscriber.

As noted before, FIGS. 3*a* and 3*b*, when placed side by side with conductors extending from FIG. 3*a* to the right in alignment with corresponding conductors at the left of FIG. 3*b*, illustrate details of the transmission device U*e*B; FIG. 4 shows the circuit of the connector; and FIGS. 5*a* and 5*b* when similarly placed side by side with the conductors extending from the right of FIG. 5*a* in alignment with corresponding conductors at the left of FIG. 5*b*, represent circuit details of the interconnecting switch AW3 and of the marker ES3, respectively.

It may be mentioned here that all switches, namely, call finders, group selectors, connectors as well as the interconnecting switches for the marker are of the known rotary motor type with respectively individual drive means. Such a rotary motor controlled switch comprises two field coils spatially mutually displaced by 90° and having an unwound Z-shaped armature rotatably journalled at the point of intersection of the axes of the field coils. The field coils are alternately operatively actuated under control of cam contacts governed by the switch shaft, thereby imparting torque to the armature and causing continuous rotation thereof, the armature in turn actuating a gear to rotate the switch shaft and therewith wipers carried thereby. The rotation is stopped responsive to simultaneous energization of the field coils, the stopping being controlled by a rapidly actuable test relay which has a normal auxiliary test relay cooperatively associated therewith.

The various classes of calls will now be described in detail, namely, (1) Extension of a Call to an Individual Line; (2) Extension of a Call to a Private Branch Exchange Line; and (3) Extension of a Call to a Party line.

(1) Extension of a Call to an Individual Line

It shall be assumed that a call is to be extended from a calling line to an individual line having, for example, the terminal digits corresponding to the number "13." Accordingly, the connector will rotate its wipers by one group step responsive to the tens digit "1" and by three steps responsive to the unit digit "3," whereupon the wipers will be in engagement with the bank contacts corresponding to the desired line.

The following switching operations are to be considered:

As soon as the impulse repeater JW in the transmission device U*e*A (FIG. 1) has received impulse series corresponding to the number to be called, there will be in the transmission device U*e*A, so long as some of the received impulse series are still stored therein, battery potential on the upper line conductor R (FIG. 3*a*). This potential serves as a demand signal for the connection of the respective setting sets of the individual selection stages by the corresponding interconnecting switches, to the connection path involved in the extension of the call. This demand signal causes operative actuation of relay RS in the marker ES3 (FIG. 5*a*), by way of the group selectors which had been set responsive to preceding current impulse series and by way of the transmission device U*e*B, in a circuit (1) —, left top of FIG. 3*a* (in the transmission device U*e*A; FIG. 1), . . . conductor R, 1*c* over to FIG. 3*b*, start conductor, over to FIG. 5*a*, 37*us*, RS, 2*cs*, +

Relay U*t* in the transmission device U*e*A receives due to the high resistance of relay RS insufficient current and remains at normal.

It may be mentioned that relay US in the marker ES3 (right lower center of FIG. 5*a*) which controls the contact 37*us* in the above traced circuit "1" is normally energized in the circuit (2) +, 75/3, 3*s*, 4*d*, US, —

Relay RS, upon energizing in the circuit "1" closes its contact 5*rs* to cause energization of relay S (left lower center of FIG. 5*a*) in the circuit (3) +, 5*rs*, *S*, —

Relay RS also actuates contact 6*rs*, opening the shunt around winding II of relay V (II–V) at contact 7*rs* and thereby closing a circuit for the actuation of relay V (near bottom center of FIG. 5*a*) over both its windings II and I, namely, circuit (4) +, 6*rs*, open break contact 7*rs*, II–V, I–V, —

Upon energizing in the circuit "3," relay S connects the two field coils N1 and N2 (near bottom left of FIG. 5*a*) of the interconnecting switch AW3 (indicated at the top of FIG. 5*a*) for operation, field coil N2 operating first in the circuit (5) +, 9*s*, cam controlled contact *n*2, field coil N2, —

The interconnecting switch AW3 is actuated under control of the alternately closing and opening cam contacts *n*1 and *n*2, rotating its wipers automatically. As soon as the connection path involved, which had been marked by the demand signal, is found, relay AP (top left of FIG. 5*a*) will energize by way of wiper *n*II, in the circuit (6) +, windings II and I of relay AP, 12*v*, 14*us*, wiper *n*II, over to FIG. 3*b*, over to FIG. 3*a*, 1*c*, . . . U*t* (in the transmission device U*e*A), —

Relay U*t* in the transmission device U*e*A energizes in this circuit ("6") due to the low resistance of relay AP, and initiates the transmission of the impulse corresponding to the tens digit "1" consisting of a single current impulse. Relay AP closes its contact 15*ap* to cause energization of relay AS (winding I) in the circuit (7) +, 15*ap*, 16*m*, AS–I, —

Relay AP stops further rotation of the wipers of the interconnecting switch by closing its contact 33*ap*, thereby completing a bridge for the motor field coils N1, N2 involving the circuit (8) N2, *n*2, 33*ap*, N1

Relay AS connects the seizure relay CS (left center of FIG. 5*a*) in the circuit (9) +, 21*as*, CS, resistor Wi1, —

Relay CS opens its contact 2*cs*, thereby interrupting the circuit "1" for the relay RS which releases with some delay, followed by delayed release of relay S (circuit "3") due to opening of contact 5*rs*. Relay V which is held operated after restoration of relay RS in the circuit

(10) +, 8*s*, 7*rs*, I–V, — restores to normal with a delay after opening of contact 8*s* responsive to restoration of relay S. Relay AP will now function as impulse receiving relay. The single current impulse (tens series) transmitted by the transmission device U*e*A disconnects battery potential briefly, again reconnecting such potential. Relay AP is accordingly briefly de-energized. Relay AS (see also circuit "7") follows the impulsing. It shall be noted here that relay L, winding I (I–L) had been energized responsive to energization of relay CS, in the circuit

(11) +, T–I (bottom right of FIG. 3*b*), 2*rb*, conductor V over to FIG. 5*a*, wiper *n*V of the interconnecting switch AW3, 24*cs*, 23*s*, I–L, —

Relay L is held energized locally over its second winding II–L (bottom right of FIG. 5*b*) in the circuit

(12) +, 1*cs*, 60*l*, II–L, —

The evaluation of the incoming current impulse series is effected by a counting chain comprising the relays I, II . . . V (FIGS. 5*b* and 5*a*) the operation of which is apparent from the following table:

| Digit | Counting chain relay energized at the end of the digit |
|---|---|
| 1 | I, II |
| 2 | II |
| 3 | I |
| 4 | IV |
| 5 | IV, I, II |
| 6 | IV, II |
| 7 | I, V |
| 8 | V |
| 9 | I, II, V |
| 0 | II, V |

The counting chain always marks one of the marker lines *x*1, *x*2 . . . *x*0 (top right of FIG. 5*b*) extending to the *d*-contact bank of the connector (FIG. 4). Relay *I* (winding *Ia*; FIG. 5*a*) of the counting chain is operatively connected by the first current impulse which is signified by the deenergization of relay AS, in the circuit

(13) +, 1*cs* (bottom left of FIG. 5*b*), 39*as*, over to FIG. 5*a*, 40*v*, 421, 76/3, 77/2, I*a*, —

Relay V which has not yet deenergized is held operated during the receipt of an impulse series in the circuit

(14) +, 1*cs*, 39*as*, 40*v*, rectifier G13 (bottom of FIG. 5*a*), 7*rs*, I–V, —

After conclusion of the impulse series which in the assumed case consists of a single current impulse, relays AP and AS will be continuously energized. This will cause energization of relay II of the counting chain, over its winding II*b* (FIG. 5*b*), while relay I will be held energized over its winding I*b*, in the circuit $$(15)+,\ 1cs,\ 38as,\ \frac{78/1,\ 79/3,\ IIb}{80/1,\ Ib},-$$

Upon conclusion of the impulse series, relay V will deenergize over its winding I*b*, in the circuit circuit "14"). Responsive to restoration of relay V, relay AP is due to opening of contact 12*v* disconnected from the switch wiper *n*II and therewith also from the incoming line conductor. Relay AP restores. However, relay AS is in its place connected to the switch wiper *n*II and is held energized by way of the incoming line conductor, in the circuit

(16) +, AS–II (left upper center of FIG. 5*a*), 3*as*, 13*v*, 14*us*, wiper *n*II, over to FIG. 3*b*, conductor II (bottom right of FIG. 3*b*), over to FIG. 3*a*, 1*c*, line conductor R, . . . U*t* (in the transmitting device U*e*A), —

Relay M (bottom right of FIG. 5*b*) is energized responsive to restoration of relay V in the circuit

(17) +, 1*cs*, 43*v*, M, —

Responsive to actuation of relay M, relay D (bottom of FIG. 5*b*), will be energized in the circuit

(18) +, 1*cs*, 38*as*, 44*m*, 45*l*, D–I, D–II, —

Relay D, upon energizing, causes the connector (FIG. 4) to start operating by closing for the field coil M1 thereof the circuit

(19) +, 10*d* (bottom left of FIG. 5*a*), wiper *n*VII of the interconnecting switch AW3, over to FIG. 4, cam controlled contact *m*1, field coil M1, —

The connector (FIG. 4) rotates its wipers *a*, *b*, *c*, *d* under control of the field coils M1, M2 which are alternately operatively connected by way of the cam controlled contacts *m*1 and *m*2, seeking the bank contacts of the marked line. As soon as such line is found, a capacitor test circuit is closed by way of the marked main stop position preceding the line group which contains the desired subscriber line, namely, circuit

(20) Capacitor Co6 (central part of FIG. 5b), resistor Wi4, 50m, test relay BP–I, 81/2, 82/1, 83/5, 84/4, marker line x1, over to FIG. 4, main stop position HR1, wiper d of the connector, conductor III, wiper nIII of the interconnecting switch (see top left of FIG. 5b), 52m, capacitor Co6

The capacitor Co6 was charged prior to the actuation of relay M in the circuit

(21) +, 51m (left center of FIG. 5b) Co6, resistor Wi4, 53m, resistor Wi5, —

The test relay BP energizes and is held energized over its winding II in the circuit

(22) +, 1cs (bottom left of FIG. 5b), resistor Wi6, 59bp, winding II–BP, resistor Wi5, —

Relay BP upon energizing, stops further rotation of the wipers of the connector, with the wipers in engagement with the bank contacts of the main stop position, by completing a bridge for the two field coils M1, M2, in the circuit

(23) M2 (bottom left of FIG. 4), conductor VIII, over to FIG. 5a, wiper nVIII of the interconnecting switch AW3, 63cs, 65v, 64bp, 62cs, wiper nVI, over to FIG. 4, conductor VI, field coil M1, —

Relay BP shortcircuits the winding II of relay AS (AS–II) in the circuit

(24) +, 26bp (left off center in FIG. 5a) 28l, 29d, AS–II, +

Relay AS deenergizes, opening contact 21as (left center of FIG. 5a) and thereby initiating the release of relay CS. Relay D releases due to the opening of contact 38as; relay CS restores responsive to release of relay D. Release of relay CS causes due to opening of contact 1cs (left bottom of FIG. 5b) interruption of the holding circuits for relays M, L, BP, thereby releasing the marker. The release time of relay US is longer than is required for the operation of the marker.

Upon release of the relay CS, the start relay RS (left top of FIG. 5a) will again be connected, by way of contact 2cs, to the start conductor and the incoming line conductor R, for receiving the start signal from the transmission device UeA. The start relay RS causes the interconnecting switch AW3 to operate again and such switch again establishes connection with the connection path involved. The previously explained operations are repeated with the difference that ground is not connected to the wiper nV of the interconnecting switch, in the transmission device UeB (FIG. 3b; conductor V), after the interconnecting switch has established connection with the connection path involved. This is due to the fact that relay T (bottom right in FIG. 3b) has caused operation of relay U over winding I thereof (U–I; right center in FIG. 3a), the latter having caused relay Rb to actuate. The corresponding operations will be presently explained more in detail. Relay Rb, upon energizing, opens its contact rb, thereby disconnecting winding I of relay T (T–I) from the conductor V and therewith from wiper nV, and closes its contact 3rb, thereby placing the relays E and C, which are connected to battery potential, on the wiper nV. The condition brought about by these operations signifies in the transmission device UeB the fact that the tens digit had already been transmitted to the marker, such condition being marked in the marker, upon receipt of the units digit, by preventing energization of relay L responsive to actuation of relays S and CS. Accordingly, relays AP, AS, V, CS and US will be energized in the marker at the beginning of the transmission of the units digit, consisting in the assumed example of three current impulses. In the transmission device UeA, relay Ut is again energized in series with low resistance relay AP in the marker, relay Ut initiating the transmission of the units digit. Relays AP and AS in the marker are actuated in timing with the current impulses. The consequence of the non-operation of relay L is that the current impulse series, received in the marker, is not extended to the counting chain. Such impulse series is utilized for directly controlling the stepwise operation of the connector, by means of the relay TS (top right of FIG. 5a) so as to advance the wipers thereof into engagement with the bank contacts of the desired individual line. Responsive to the first current impulse, signified by restoration of relay AS, both field coils M1 and M2 of the connector will be on current in the circuits

(25) +, 10d (bottom of FIG. 5a), wiper nVII of the interconnecting switch AW3, over to FIG. 4, conductor VII, m1, M1, —;

and

(26) +, 10d, nVII, m1, conductor VI, nVI, 62cs, 66as, TSI, 63cs, wiper nVIII, M2, —

The winding II of relay TS (TS–II; lower center of FIG. 5b) is at the same time connected in the circuit

(27) +, 10d (bottom of FIG. 5a), 72as, over to FIG. 5b, TS–II, —

The two windings of relay TS are, however, in opposition and the relay remains at normal.

Relay AS energizes again at the conclusion of the first impulse. The circuit for the connector field coil M2 and the circuit for winding TS–I are thereby interrupted at contact 66as. The circuit for the winding TS–II is interrupted at contact 72as. Accordingly, only the connector field coil M1 is now energized and the connector wipers are advanced by one step, whereby the cam controlled contact m1 is opened and m2 is closed, thereby placing the field coil M2 on current while maintaining field coil M1 energized to stop the connector, the circuits involved being

(28) +, 10d, nVII, m2, M2, — and

(29) +, 10d, 73as, over to FIG. 5b, 69l, 70h, back to FIG. 5a, 68ts, 62cs, nVI, M1, —

At the next current impulse, again signified by restoration of relay AS, the field coil M2 will be connected in the circuit "28" while field coil M1 will be connected in the circuit

(30) +, 10d, nVII, m2, nVIII, 63cs, TS–I, 66as 62cs, nVI, M1, —

Since both field coils are on current, the connector is still held in stopped position. The relay TS is now, however, operatively actuated since its winding I (TS–I) is energized in the same sense as its winding II (TS–II) which is again on current in the circuit "27." Upon actuating, relay TS opens its contact 68ts and closes its contact 67ts. The winding TS–II is at the same time held energized in the local circuit

(31) +, 10d, 74ts, TS–II, —

Upon re-energization of relay AS (impulse pause), the circuit for the field coil M1 is interrupted at contact 66as (see circuit "30"); since only the field coil M2 is now connected to current, the connector advances its wipers a second step, whereby cam controlled contact m2 is opened while contact m1 is closed again.

Upon release of relay AS incident to the third current impulse, the field coil M1 is again directly energized (see circuit "25"). The field coil M2 is energized by way of the winding I of relay TS (TS–I) and the connector is accordingly stopped. Relay TS deenergized due to the effect of its oppositely acting windings I and II. The interplay is repeated.

At the conclusion of the third impulse, relays AP and AS will be continuously energized and relay V is accordingly released. Upon release of relay V, relay M will be energized (see circuit "17"). Since the bank contacts of the connector which correspond to individual lines and, as will be presently explained more in detail, also the bank contacts corresponding to private branch exchange lines, are extended from the contact field of the connector marker contact bank which is swept by wiper *d*, to the marker, a capacitor test circuit will be closed for the relay BP by way of the line *x13* (top of FIG. 5*b*) after the connector has set its wipers with respect to the bank contacts associated with line "13," such test circuit being circuit

(32) Co6 (left center of FIG. 5*b*), resistor Wi4, 50*m*, BP–I, 89/2, 83/1, 86/4, 87/5, 57*h*, line *x13*, over to FIG. 4, connector wiper *d*, conductor III over to FIG. 5*b*, wiper nIII, 52*m*, Co6.

Upon energizing, relay BP causes the connector to stop. Moreover, relay BP by closing its contact 26*bp* (left of center of FIG. 5*a*) places direct ground potential on the wiper *n*V of the interconnecting switch AW3, thereby causing energization of relays E and C in the transmission device U*e*B in the circuit

(33) +, 26*bp* (left of center of FIG. 5*a*), 27*l*, 24*cs*, wiper *n*V, over to FIG. 3*b*, conductor V contact 3*rb*, winding I of relay E(I–E), winding I of relay C(I–C), over to FIG. 3*a*, resistor Wi1, —

Relay C (FIG. 3*b*), by opening contact 1*c* (top of FIG. 3*a*) interrupts the switch-through circuit between the transmission device U*e*B and the marker, and prepares the test circuit for the test relay P (FIG. 3*b*) which will now test by way of test conductor *s* and the test or private wiper *c* of the connector (FIG. 4) whether the desired subscriber line is idle or busy. The transmission device U*e*B (FIGS. 3*a* and 3*b*) also serves for other switching operations such as battery feed for the parties engaged in the call, ringing of the called party and transmission of the line criteria including the busy tone. The release of the connection is moreover initiated in the transmission device U*e*A. The corresponding operations will be presently explained in detail.

Relay V in the marker restored upon conclusion of the receipt of the units digit. As a consequence, in place of relay AP, relay AS, winding II (AS–II; left center in FIG. 5*a*) was again connected to wiper *n*II, therefor to conductor II (bottom of FIG. 3*b*) and therewith by way of contact 1*c* (top of FIG. 3*a*) to the incoming line conductor R (relay AS had been held in series with relay U*t* in the transmission device U*e*A). Due to the interruption of the incoming line conductor at contact 1*c* (top of FIG. 3*a*), responsive to energization of relay C in the transmission device U*e*B, relay AS (FIG. 5*a*) in the marker restores, causing restoration of relay CS (left center of FIG. 5*a*) and therewith restoration of all relays of the marker which are at that instant still actuated. Accordingly, the marker is again released.

As already explained, relay T (bottom right of FIG. 3*b*) in the transmission device U*e*B, prior to the receipt of the tens digit, had been energized in series with relay L (I–L; lower center of FIG. 5*a*) in the marker. Relay T is held over its second winding T–II (near top left of FIG. 3*a*) by way of the incoming *s*-conductor extending from the transmission device U*e*A, in the circuit

(34) +, *s*-conductor, 4*c*, T–II, resistor Wi2, 7*p*, resistor Wi1, —

Relay T connects relay U (right center of FIG. 3*a*) by way of its contact 26*t*, in the circuit

(35) +, 25*p*, 26*t*, U–I, —

Relay U closes contact 24*u* (left center of FIG. 3*a*), thereby operatively connecting relay R*b* over its winding II (R*b*–II) in the circuit

(36) +, 24*u*, R*b*–II, 7*p*, resistor Wi1, —

Upon energizing, relay R*b* opens its contact 2*rb* while closing its contact 3*rb* (bottom right of FIG. 3*b*), thereby disconnecting winding T–I from conductor V, now extending to the wiper *n*V (top of FIG. 5*a*), preparatorily connecting instead by way of contact 3*rb* the relays E and C which are connected to battery potential by way of resistor Wi1 (center of FIG. 3*a*). As already explained, relay BP in the marker ES3 is energized at the conclusion of the units impulse series, placing direct ground potential on the wiper *n*V by closing its contact 26*bp* (left center of FIG. 5*a*), thereby causing energization of relays E and C in the transmission device U*e*B, in the circuit

(37) +, 26*hp*, 27*l*, 24*cs*, wiper *n*V, over to FIG. 3*b*, conductor V, 3*rb*, E–I, C–I, over to FIG. 3*a*, resistor Wi1, —

Relay E is held over its second winding II–E (center of FIG. 3*b*), in the circuit (38*a*) +, 9*c* (center of FIG. 3*b*), 10*c*, 11*f*, 56*e*, E–II, —

Relay C is held from ground at contact 81*c* (near bottom center of FIG. 3*b*) in the circuit (38*b*) +, 81*c*, C–I, over to FIG. 3*b*, resistor Wi1, —

It may be mentioned at this point that relay U, upon energization thereof, had opened contact 21*u*, thereby interrupting the short circuit around winding I of relay C (I–C). Relay C opens its contact 4*c* (top left of FIG. 3*a*), thereby interrupting the holding circuit for relay T, winding II (T–II) and thus causing relay T to release, while closing its contact 5*c*, thereby placing ground potential on the incoming *s*-conductor as a busy potential. At contact 1*c* (top of FIG. 3*a*) relay C interrupts the extension of the incoming line conductor R to the setting device, causing release thereof as already described, and closure of contact 6*c* connects the line conductors through, thereby causing energization of line relay A, windings I and II (near top center of FIG. 3*a*) over the calling subscriber loop, in the circuit

(39) +, I–A, 27*z*, line conductor T, subscriber loop, line conductor R, 6*c*, 28*z*, A–II, —

The holding circuit for relay U (circuit "35") is interrupted upon release of relay T, relay U releasing with delay. The holding circuit for relay R*b* is thereupon interrupted and such relay releases with delay. During the release interval of relay U, the test circuit of relay P is closed to the line circuit of the called individual line by way of the outgoing *s*-conductor and test or private wiper *c* of the connector. If the corresponding line is idle, battery potential from the line circuit will be on the *s*-conductor and relay P will be energized in the circuit

(40) +, 9*c* (center of FIG. 3*b*), P–I, 16*u*, 17*b*, *s*-conductor, over to FIG. 4, connector wiper c, conductor *s*13, *gh*1, *G*13, —

Relay P is held over its second winding P–II (right of center in FIG. 3*b*) and the outgoing conductor *p*, in the circuit

(41) +, 9*c*, 18*p*, 31*b*, 32*f*, P–II, *p*-conductor, over to FIG. 4, magnet A*d* of the connector, —

The purpose of magnet A*d* which energizes in this circuit is to press the line wipers *a* and *b* of the connector into engagement with the line bank contacts of the called line, thereby connecting the line conductors through. Upon energization of relay P and during the release interval of relay U, relay R*a*, winding II (R*a*–II;

left bottom of FIG. 3*a*) is energized to cause transmission of the first ring to the called line, in the circuit

(42) +, U–III, U–II in parallel with thermistor HL, 33*u*, R*a*–II, 35*e*, 37*f*, 8*p*, resistor W*i*1, —

Relay R*a* connects relay Q, winding I (Q–I; left center of FIG. 3*b*) in the circuit

(43) +, 9*c* (center of FIG. 3*b*), 10*c*, 11*f*, 12*ra*, 38*q*, Q–I, —

Relay Q is held actuated by way of its own contact 39*q* in the circuit

(44) +, 9*c*, 10*c*, 11*f*, 39*q*, Q–I, —

Upon actuation of relay Q, ringing current, for example, 20 cycles, is connected to the called line in the circuit

(45) +, 46*q* (near top, right in FIG. 3*a*), T-conductor, over to FIG. 4, connector wiper *b*, called line ringer, back to FIG. 4, R-conductor, *a*-wiper, over to FIG. 3*b*, 47*q*, over to FIG. 3*a*, capacitor C*o*4 in parallel with relay F, 40*ra*, 41*e*, 20 cycle source, —

In case the called party answers responsive to the first ring, relay F (right top in FIG. 3) will energize and will immediately interrupt the circuit for relays U and R*a* (at contact 37*f*; near bottom left of FIG. 3*a*) and also the circuit for relay Q, winding I (Q–I; center left in FIG. 3*b*) at contact 11*f*. Relay F is held over its second winding (above center right in FIG. 3*b*) in series with winding PII and the magnet A*d* of the connector, FIG. 4.

If the called line does not answer in response to the first ring, relay R*a*, after release of relay U, will be energized once every 6 seconds to provide for continuous ringing. It may be mentioned here that relay U which is held in series with relay R*a*, winding II (R*a*–II; left bottom in FIG. 3*a*) over its contact 33*u*, is restored by the action of the opposing winding U–II. This is effected by the action of the thermistor HL which is connected in parallel with winding U–II and changes its resistance upon heating up in the relay circuit, thereby making the opposing winding U–II operatively effective. Upon release of relay U, relay R*a* is actuated once every 6 seconds in the circuit

(46) +, 6 seconds switch 6″, 34*u*, R*a*–II, 35*e*, 37*f*, 8*p*, resistor W*i*1, —

Responsive to answering of the called party, the ring disconnect relay F is again energized either in the ringing circuit or by way of resistor W*i*4 (center right in FIG. 3*a*) in the direct current subscriber loop. Relay F opens its contacts 37*f* and 11*f*, thereby disconnecting relays R*a* and Q. Upon release of relay Q, the battery feed relay B, winding II (B–II; top right in FIG. 3*a*) and winding I (B–I; top left in FIG. 3*b*) will energize in the called line loop in the circuit

(47) +, B–II, line conductor T, *b*-wiper of the connector, subscriber loop, *a*-wiper of the connector, line conductor R, 48*q*, 49*u*, B–I, —

Relay B closes its contacts 50*b*, 51*b*, thereby finally switching the line conductors through. Relay B, at contact 17*b*, removes the short circuit about relay Z, winding I (Z–I; near top of FIG. 3*b*), such relay now energizing by way of the S-conductor to the line circuit of the called subscriber, in the circuit

(48) +, 52*p* (lower right in FIG. 3*a*), over to FIG. 3*b*, Z–I, S-conductor to FIG. 4, connector *c*-wiper, S13, *gh*I, G13, —

Winding Z–I is again short circuited over contact 53*z*, but relay Z is held actuated over its second winding II (Z–II; lower center in FIG. 3*a*) in the circuit

(49) +, 80*b*, 54*z*, Z–II, —

Relay Z opens contacts 27*z*, 28*z* while closing its contacts 29*z*, 30*z* (near top of FIG. 3), thereby reversing the line conductors to initiate metering of the call at the calling end of the connection.

In the event that the called line is busy, relay P (upper part of FIG. 3*b*) will not energize during the release interval of relay U, the latter relay releasing, followed by the release of relay R*b*. Since there is in such case ground on the conductor S13, FIG. 4, from *gh*2 in the called party's line circuit, relay Q, winding I (Q–I; left center in FIG. 3*b*) will be energized during the release interval of relay R*b*, in the circuit

(50) +, *gh*2, S13, connector wiper *c* (FIG. 4), *s*-conductor to FIG. 3*b*, 17*b*, 15*u*, 13*p*, 14*rb*, 38*q*, Q–I, —

Relay Q closes a holding circuit for itself over its contact 39*q* (circuit "44"). 60-cycle busy tone is now connected to winding III of line relay A (A–III; near left bottom in FIG. 3*b*) in the circuit

(51) +, BT (60-cycles), 62*q*, 59*p*, A–III, —

The busy tone is now induced into the windings I and II of relay A which are connected to the line conductors (near top in FIG. 3*a*) and thus inductively transmitted to the calling line. Upon replacement of the receiver at the calling line, the connection will be released. The battery feed or line relay A (near top of FIG. 3*a*) in the transmission device U*e*B releases, closing its contact 22*a* and thereby shortcircuiting winding I of the seizure relay C (I–C; center of FIG. 3*b*). Relay C restores and at its contacts 9*c*, 10*c* (center of FIG. 3*b*) interrupts the holding circuits for relays Q and E.

In the absence of the connector outlet S13, there will be neither battery nor ground potential on the corresponding bank contact and, accordingly, neither relay P in the transmission device U*e*B (operable when a called line is idle) nor the relay Q (operable when a called line is busy), will be energized. Responsive to release of relay R*b*, relay X (bottom in FIG. 3*b*) thereupon energizes in the circuit.

(51*a*) +, A–III, 59*p*, 61*q*, 63*as*, 64*rb*, X, —

Relay X closes its contact *x*1, thereby connecting a magnetic tape answering device A*ns* by way of capacitor C*o*7 in parallel with its own winding and to the winding A–III, the tape device transmitting a recorded message, for example "The called line has been disconnected." This message is inductively transmitted to the windings A–I and A–II and from there to the calling party. The connection is released responsive to replacement of the receiver at the calling station.

The release of the connection after extension thereof to a called line requires replacement of the receivers at both stations involved in the call so as to effect release of the battery feed or line relay A in the calling subscriber loop and release of the battery feed relay B in the called subscriber loop, respectively. Release of relay A short circuits winding I of the seizure relay C (I–C; center of FIG. 3*b*) by closure of contact 22*a*. The holding circuits for relays F and P as well as for the magnet A*d* of the connector are interrupted responsive to release of relays C and B. Relay Z releases upon restoration of relay B. Upon release of relay C, the high resistance winding III of relay R*a* (left center in FIG. 3*b*) is again connected, in the circuit

(52) +, 65*rb*, 67*th*, 68*t*, 69*c*, R*a*–III, —

Relay R*a* energizes whereby the transmission device can again be placed on battery potential by way of the incoming S-conductor and contacts 4*c*, 71*t*, 70*ra* (top left in FIG. 3*a*).

In case the called party T*n*B replaces the receiver while the calling party T*n*A fails to replace, the transmission device U*e*B will be released by the action of the thermo-relay TH (bottom center in FIG. 3*a*), the relay TH being heated in the circuit

(53) +, 80*b*, TH, 54*f*, 8*p*, resistor W*i*1, —

Responsive to energization of relay TH, the opposing winding II of relay C (C–II; right of center in FIG. 3*a*) will be operatively connected in the circuit

(54) +, 65*rb* (left lower part in FIG. 3*b*), 66*th*, 73*a*, over to FIG. 3*a*, 23*c*, C–II, —

Relay C deenergizes, opening its contact 6*c* (top of FIG. 3*a*), thereby disconnecting relay A from the incoming line conductors and consequently causing relay A to deenergize. Ground is in addition disconnected from the incoming S- conductor, at contact 5*c* (top left of FIG. 3*a*), causing release of the preceding connection devices.

In case only the party at the calling station T*n*A should replace the receiver, while T*n*B does not replace, relay A will be restored, and relay B will remain energized. This will cause relay TH (bottom of FIG. 3*a*) to heat up again, in the circuit

(55) +, 57*a*, TH, 54*f*, 8*p*, resistor Wi1, —

Relay U, winding I (U–I; right lower part of FIG. 3*a*) is thereupon energized in the circuit

(56) +, 65*rb* (left lower part of FIG. 3*b*), 66*th*, 73*a*, over to FIG. 3*a*, 74*b*, U–I, —

Relay U energizes and at contact 49*u* (left top of FIG. 3*b*) interrupts the circuit of the battery feed relay B, such relay restoring. It shall be mentioned here that relay C restored upon release of relay A and prior to energization of relay U, due to contact 22*a* placing a short circuit around winding I–C (lower center part of FIG. 3*b*). Upon release of relay B, relay U restores with some delay due to opening of contact 74*b* (right lower part of FIG. 3*a*). At this time, the following circuit is closed for the two windings of the test relay, extending to the connector magnet A*d*, namely

(57) +, 52*p* (right lower part of FIG. 3*a*), over to FIG. 3*b*, 16*u*, P–I, 18*p*, F–II, P–II, *p*-conductor, over to FIG. 4, A*d*, —

The windings of relay P are in this circuit oppositely energized, causing relay P to restore. Contact 18*p* is accordingly opened, and the circuit for the connector magnet A*d* (which controls the engagement of the line wipers *a*, *b*, with the corresponding bank contacts) is finally interrupted. Upon release of relays P and F (right upper part of FIG. 3*b*), the thermo-relay TH (lower central part of FIG. 3*a*) is disconnected again. Upon cooling down of the thermo-relay TH, the winding R*a*–III (lower left part of FIG. 3*b*) is connected again (see circuit "52"), thus readying the transmission device for operation in connection with another call.

(2) *Extension of a Call to a Private Branch Exchange Line*

It shall first be noted that the outlets (bank contacts) corresponding always to the first and the last station of a private branch exchange are extended, from the marker contact bank contacts of the connector (FIG. 4), which are swept by the connector wiper *d*, to the marker shown in part in FIG. 5*b*.

It shall, for example, be assumed, that a private branch exchange line is reached by the terminal number 21. Accordingly, the first line of the private branch exchange extends in the contact bank *d* from position 21, from which the line *x*21 is wired to the marker. The private branch exchange shall be assumed to have four successively positioned lines, so that the last line is connected to the bank contact 24 from which the line *x*24 extends to the marker. In the setting device, (FIG. 5*b*), relay H will energize in the first position of the private branch exchange, the energization of relay H signifying that the call involved is a call to a private branch exchange line.

The control of the marker, by the tens digit, in the assumed case digit "2," is effected in the same manner as already explained in connection with the extension of a call to an individual line, with the only difference, that the marker line *x*2 is marked solely by relay II of the counting chain. When this line is reached by the connector wipers, relay BP in the marker will be energized by way of the capacitor Co6 (center part of FIG. 5*b*) and the wiper *n*III (left top of FIG. 5*b*) as well as wiper *d* of the connector. Relay BP, upon energizing, stops rotation of the connector wipers. The marker is released and is immediately taken into use again for the receipt of the units digit.

Upon receipt of the units digit, in the assumed case digit "1," in the marker, in which case relay L remains at normal, the wipers of the connector will be in bank contact position 21. In this position, relay H, FIG. 5*b*, will be energized in the circuit

(58) Co5 (left upper part of FIG. 5*b*), 56*l*, 52*m*, wiper *n*III of the interconnecting switch, over to FIG. 4, wiper *d* of the connector, *x*21 (continue tracing in FIG. 5*b*), H–I, 54*m*, Co5

It shall be mentioned here that the capacitor Co5, prior to actuation of relay M, had been charged in the circuit

(59) +, 51*m*, 56*l*, Co5, 55*m*, resistor Wi5, —

Relay H will be held locally over its second winding II (II–H; lower center part of FIG. 5*b*), in the circuit

(60) +, 1*cs* (bottom left of FIG. 5*b*), 58*h*, H–II, —

Relay H, upon energizing, closes its contact 31*h* (top near center, FIG. 5*a*), thereby placing the test relay AP on the wiper *n*IV of the interconnecting switch AW3 and therewith by way of conductor IV (FIG. 4) on the test wiper *c* of the connector. The relay AP now tests for the busy or idle condition of the line 21. In case the first line is idle, relay AP will immediately energize in the circuit

(61) +, AP–II, AP–I (upper center part of FIG. 5*a*), G15, 31*h*, 32*as*, wiper *n*IV of interconnecting switch AW3, over to FIG. 4, conductor IV, connector wiper *c*, S21, line circuit, —

In the event that the corresponding line is busy, the connector will hunt with respect to the other private branch exchange lines. This hunting is effected by the opening of contact 70*h* (left upper part of FIG. 5*b*), responsive to actuation of relay H, thereby preventing individual stepping control of the connector. The start line for the two connector field coils M1 and M2 is closed again by relay D, at contact 10*d* (bottom left of FIG. 5*a*), relay D, responsive to actuation of relay H, having been connected in the circuit

(62) +, 1*cs* (left bottom of FIG. 5*b*) 38*as*, 44*m*, 48*h*, D–I, D–II, —

The connector rotates its wipers in free hunting operation, controlled by the cam contacts *m*1, *m*2, until it finds an idle private branch exchange line. As soon as such idle line is found, relay AP (upper center of FIG. 5*a*) will again test to the line circuit of the corresponding line. Relay AP energizes and causes the connector to stop further rotation of its wipers by completing a bridge for the two field coils M1 and M2 (FIG. 4) in the circuit

(63) M1, conductor VI, over to FIG. 5*a*, wiper *n*VI of the interconnecting switch AW3, 62*cs*, 61*ap*, 65*v*, 63*cs*, wiper *n*VIII, over to FIG. 4, conductor VIII, M2.

Relay AP, upon energizing, also connects at contact 15*ap* (center of FIG. 5*a*) ground potential to the wiper *n*V of the interconnecting switch so as to effect operative actuation of relays E and C in the transmission device UeB, in the circuit

(64) +, 15*ap*, 17*m*, 24*cs*, wiper *n*V, over to FIG. 3*b*, conductor V, 3*rb*, I–E, I–C, over to FIG. 3*a*, resistor Wi1, —

The consequence is that the relays T, U, R*b*, in the transmission device UeB, successively release with delay. During the release of relay U, relay P in the transmission device tests on the idle line and after its energization causes, as already explained in connection with the extension of a call to an individual line, transmission of the first ring and, if needed, subsequently transmission of continuous ringing. All other operations in the transmission device correspond to those already described.

In case the connector does not find an idle branch exchange line incident to its hunting operation, it will rotate its wipers to the last position. In this position, the relay BP (central part of FIG. 5*b*) will be energized by way of the *d*-contact bank of the connector and conductor *x*24, in the circuit

(65) *Co*6 (central part of FIG. 5*b*), resistor *Wi*4, 50*m*, relay BP–I, 89/2, 83/1, 86/4, 87/5, *x*24, connector wiper *d*, wiper *n*III of the interconnecting switch AW3, 52*m*, *Co*6

Relay BP again closes a holding circuit for itself over its second winding BP–II (right central part of FIG. 5*b*) and instantly stops further rotation of the connector wipers by closing its contact 64*bp* (upper right part of FIG. 5*a*) to close a bridge for the two field coils M1 and M2 of the connector, thus preventing rotation of the connector wipers beyond the bank contacts belonging to the last private branch exchange line included in the desired private branch exchange number.

At contact 26*bp* (upper left part of FIG. 5*a*) relay BP also connects ground potential to the wiper *n*V of the interconnecting switch AW3, such ground potential being extended to conductor V (bottom right of FIG. 3*b*) for the energization of relays E and C (see circuit "37"). Relay AP in the setting device now tests, by way of wiper *n*IV and test wiper *c* of the connector, FIG. 4, to ascertain whether the reached line is busy or idle.

If the line is idle, relay AP energizes and again extends ground to the transmission device UeB, by way of wiper *n*V, such potential remaining, however, without effect, since relays E and C are already energized. In the transmission device UeB, test relay P tests the last step or position of the private branch exchange, again by way of conductor S and the test wiper *c* of the connector, to ascertain the idle or busy condition of such last line. If the line is idle, relay P will energize; if busy, relay P will remain at normal. The remaining switching operations correspond to those already explained in connection with the extension of a call to an individual line.

*(3) Extension of a Connection to a Party Line*

A party line may have connected thereto up to ten subscriber stations which may, but need not, belong to a single line group (decade). The individual subscribers of a party line may indeed be distributed as desired over the entire contact bank of the connector, since each such subscriber of the corresponding party line has its individual bank contacts in the connector. It is of course clear that these bank contacts must be mutually interwired in the contact bank of the two line wipers *a* and *b* and the test wiper *c* of the connector, since the party line has, just as an individual line, only one single line circuit which marks the idle or busy condition thereof. A desired subscriber of the party line is determined by the bank contacts of the connector reached responsive to the "units selection." The connector bank contacts corresponding to the party line subscribers, which are accessible to the *d*-wiper of the connector, are not mutually interwired; neither are they extended (as in the case of individual lines and private branch exchange lines) to the marker. However, to these bank contacts are connected timers, for example, in the form of interrupters, serving the purpose of controlling, for the different frequency code calls in the transmission device UeB, the ringing frequencies *f*1 . . . *f*5 (bottom right in FIG. 3*a* to be connected to the line conductors in different timing. The ringing frequencies are in the transmission device UeB by means of corresponding cam contacts extended to the bank contacts of the *d*-contact bank, in a certain time sequence, and synchronously are extended to these bank contacts in the same sequence, the timing signals controlling these frequencies. The timings allocated to the individual subscribers are at the *d*-contact bank combined with different current direction criteria which are evaluated in the transmission device UeB by the polarized relays R*a*, R*b* (top right of FIG. 3*b*). These criteria make it possible to effect the connection of the ringing frequencies in the transmission device UeB in two different groups *f*1, *f*2, *f*3 and *f*4, *f*5, respectively, whereby a plurality of ringing frequencies can be placed in the same time intervals without incurring the danger of wrong calls. Five frequencies *f*1 to *f*5 (bottom right in FIG. 3*a*) are employed for the ten party line subscriber stations, each of these frequencies being controlled by two codes, one code consisting of one long impulse and the other code consisting of two short impulses. Two groups of ringing frequencies *f*1 to *f*3 and *f*4, *f*5, respectively, are formed by two directional current criteria, for example, +50 v. and −50 v. The frequencies of the first group are in the transmission device UeB connected to the line conductors by way of line L*t*1, and the frequencies of the second group are connected to the line conductors by way of line L*t*2. The connection of the frequencies of the first group is effected by relay R*a* and the frequencies of the second group are connected by relay R*b*. The frequencies are connected to the lines L*t*1 and L*t*2, respectively, by means of cams, in a time sequence of, for example, two seconds. The interrupters (U*nt*12 and U*nt*53; FIG. 4) for the "long" or "two times short" codes are synchronously therewith connected to the corresponding bank contacts of the *d*-contact bank of the connector.

For the sake of simplicity, only three party line subscribers are indicated in FIG. 4 by wiring at the *a*-bank contacts 12, 52, 53 and by lines *x*12, *x*52, *x*53 extending from contacts at the *d*-contact bank, such lines cooperating with interrupter contacts which are connected to the potentials +50 v. and −50 v., respectively.

It shall now be assumed that a connection is to be extended to the party line subscriber "12."

Upon receipt of the tens digit "1," in the marker ES3 (FIG. 5*b*), there will be effected, in the transmission device UeB and in the marker, the same operations as already described in connection with the extension of a call to an individual subscriber line. The receipt of the units digit "2," in the marker, and the corresponding stepwise setting of the connector, are likewise substantially effected as in the case of a call to an individual line. Relay AP (upper central part of FIG. 5*a*) and therewith relay AS (lower central part of FIG. 5*a*) respond operatively to the digit impulses for directly controlling the stepwise operation of the connector. Relay V (lower left part of FIG. 5*a*) is energized during the receipt of the last impulse series. However, relay D (bottom of FIG. 5*b*), as start relay for the connector, is in this case due to the fact that relays L and H (lower central parts of FIG. 5*a* and FIG. 5*b*, respectively) are at normal, responsive to the first impulse of the units series which is signified by release of relay AS, energized in the circuit

(66) +, 1*cs* (left bottom in FIG. 5*b*), 39*as*, over to FIG. 5*a*, 40*v*, 41*l*, G14, back to FIG. 5*b*, D–I, D–II, −

In the pauses between the impulses, relay D is, upon opening of contact 39*as* and closing of contact 38*as*, held in the circuit

(67) +, 1*cs*, 38*as*, 49*v*, 46*d*, D–II, −

Upon conclusion of the impulse series, relays AP and AS remain actuated. Relay V restores due to the opening of contact 39*as*, causing restoration of relay D due to opening of contact 49*v*. Relay M (right lower part of FIG. 5*b*) is energized upon release of relay V due to closure of contact 43*v*. Accordingly, the same operations have taken place as in the case of a call to an individual line, except that relay BP (right center of FIG. 5*b*) has not been energized. As a consequence, there will not be direct ground potential connected, as in other calls, to the wiper *n*V of the interconnecting switch AW3 (top of FIG. 5*a*), contact 26*bp* being open, but ground potential by way of a resistor W*i*7 (left central part of FIG. 5*a*), thereby effecting in the transmission device U*e*B a circuit

(68) +, 20*d*, resistor W*i*7, 18*m*, 27*l*, 24*cs*, wiper *n*V, over to conductor V (bottom right of FIG. 3*b*), 3*rb*, I–E, I–C, over to FIG. 3*a*, resistor W*i*1, −

Relay E remains in this circuit at normal while relay C is energized. The immediate consequence is that a first ring will not be transmitted. Due to energization of relay C, relays T, U, R*b* will successively restore as previously described. During the release interval of relay U, relay P (winding P–I; upper central part of FIG. 3*b*) will test to the subscriber line circuit of the party line, by way of conductor S and connector wiper *c*, to ascertain whether the line is busy or idle.

If the line is busy, relay P will remain at normal, as previously explained, while relay Q will be energized by way of conductor S, to ground potential at the subscriber line circuit. Relay Q causes transmission of busy tone to the calling party as explained before (+, BT, 62*q*, 59*p*, A–III; bottom left in FIG. 3*b*), and the restoration of the receiver at the calling party's station will initiate release of the connecion.

If the called party line station is idle, relay P(P–I; upper central part of FIG. 3*b*) will be energized and by closing its contact 18*p* will complete a holding circuit for itself over its winding P–II, by way of conductor *p* and magnet A*d* of the connector, the magnet A*d* energizing in this circuit and pressing the line wipers *a* and *b* into engagement with the corresponding bank contacts extending to the party line. Relay Q (winding II–Q; lower left in FIG. 3*a*) will now be periodically briefly triggered, for example, once every 6 seconds, by a central timer PU (bottom of FIG. 3*a*), in the circuit

(69) +, PU (6 seconds), 76*q*, II–Q, 36*e*, 37*f*, 8*p* resistor W*i*1, −

Relay Q holds itself in a local circuit by way of its winding Q–I (see circuit "43"). The timer U*nt* 12 (right in FIG. 4) now places in a predetermined rhythm and with a potential of +50 v., impulses on the conductor *x*12, corresponding to the party line subscriber "12," which are extended over the connector wiper *d* and conductor D to the part of the transmission device U*e*B shown in FIG. 3*b*. These impulses effect actuation, for example, of the relay R*a* in the transmission device U*e*B, in the circuit

(70) +50 v. (right in FIG. 4), U*nt*12, *x*12, connector wiper *d*, conductor D, over to FIG. 3*b*, 19*p*, 75*e*, G18, R*a*–I, 20*q*, −

Relay R*a* actuates its contact 40*ra* (upper right in FIG. 3*a*), thereby closing a circuit to the line L*t*1 and therewith to the frequency group *f*1 to *f*3. Cam contact N*ka*1 is operated synchronously with the interrupter contact U*nt*12 (on the line *x*12 in the connector) and thereby places the ringing frequency *f*1 for the party line subscriber "12" on the line conductors, in the circuit

(71) +, −, *f*1 (bottom right in FIG. 3*a*), N*ka*1, L*t*1, 43*e*, 40*ra*, C*o*4 in parallel with I–F, over to FIG. 3*b*, 47*q*, line conductor R, through to FIG. 4, connector wiper *a*, tuned ringer at the called station "12," line conductor T, connector wiper *b*, line conductor T, over to and through FIG. 3*b* to FIG. 3*a*, 46*q*, +

If the called party responds during a ring or in a ringing pause, relay F and thereafter the battery feed relay B (both at top right in FIG. 3*a*) will be energized over the called party's line loop, as described before, resulting in operations likewise described before in connection with the extension of a call to an individual line. The line conductors at the calling side of the transmission device U*e*B are reversed again for initiating the call metering.

The connection is released upon completion of the call in the same manner as explained with reference to the extension of a call to an individual line.

Changes may be made within the scope and spirit of the appended claims which define what is believed to be new and desired to have protected by Letters Patent.

I claim:

1. In a telephone system and the like, including connector switches having access to lines of different service classes including individual lines and private branch exchange lines and also party lines, and having marker devices common to a plurality of connector switches for controlling the operation thereof in extending calls, the combination of a transmission device individual to a connector switch and disposed in the connection path involved separately from the connector and ahead thereof for executing all functions required in the building up of and extension of connections to any of the named subscriber lines of the different service classes, a circuit arrangement comprising switching means for differently marking by way of the contact blank of the connector over which the desired subscribed line is marked by a marker, the kind of service class of the desired subscriber line to which a call is to be extended, means controlled by said switching means for transmitting to the respective transmission device a criterion corresponding to the kind of service class of the desired subscriber line, said criterion being identical in the extension of calls to individual lines and to private branch exchange lines, respectively, further switching means in said transmission device, said criterion being effective in said transmission device to energize said further switching means for initiating transmission of ringing current to a called individual line and to a called private branch exchange line, respectively, means for transmitting to said transmission device a different criterion signifying extension of a call to a party line station, said different criterion being in said transmission device effective to prepare transmssion of coded frequency ringing to a called party line.

2. A structure according to claim 1, comprising a switch for interconnecting a marker with a connector involved in the extension of a call, said switching means in said marker being operatively effective incident to extension of calls to desired lines of the respective service classes to extend respectively different current criteria to said transmission device by way of a wiper of said interconnecting switch and a control conductor extending from the connector to said transmission device cooperating therewith.

3. A structure according to claim 2, comprising a relay in said transmission device which is responsive to said criteria incident to extension of a call to an individual line or to a private branch exchange, means controlled by said relay for extending ringing current to the called line, said relay remaining inoperative incident to extension of a call to a party line so as to effect transmission thereto of coded frequency ringing.

4. In a telephone system and the like, including connector switches having access to lines of different service classes including individual lines and private branch exchange lines and also party lines, and having marker devices common to a plurality of connector switches for controlling the operation thereof in extending calls, and having a transmission device individual to a connector switch and disposed in the connection path involved separately from the connector and ahead thereof for executing all functions required in the building up of and extension of connections to any of the named subscriber lines of the different service classes, a circuit arrangement comprising switching means for differently marking by way of the contact bank of the connector over which the desired subscriber line is marked by a marker, the kind of service class of the desired subscriber line to which a call is to be extended, and means controlled by said switching means for transmitting to the respective transmission device a criterion corresponding to the kind of service class of the desired subscriber line, the connector involved in the extension of a call having a bank of marker contacts comprising contacts for individual lines and for private branch exchange lines, extensions for connecting said bank contacts with the marker, test relay means in the marker operatively responsive over said extensions for connecting criteria in the form of direct ground potential to be transmitted to said transmission device upon extending a call to an individual line or to a private branch exchange line, respectively, further contact means in said marker contact bank corresponding to party lines accessible to the connector, said further bank contacts lacking extensions to said marker, whereby said test relay means remains at normal incident to extension of a call to a party line so as to effect transmission of a criterion to said transmission device in the form of ground potential by way of a resistor.

5. A structure according to claim 4, comprising means operatively effective incident to the extension of a call to an individual line for producing a test circuit by way of bank contact means in said marker contact bank of the connector, said test circuit including capacitor means and extending to a test relay in said marker, and means operated by said test relay for extending a criterion to said transmission device in the form of direct ground potential.

6. A structure according to claim 4, comprising a switch for interconnecting the marker with a connector involved in a call, an auxiliary relay operable, incident to the extension of a call to a private branch exchange line, in a test circuit extending over the first bank contact of the private branch exchange in the marker contact bank of the connector to the marker, and a second test relay operatively connected by said auxiliary relay by way of a wiper of said interconnecting switch to a test wiper of said connector for testing private branch exchange lines during free hunting operation of said connector to ascertain an idle private branch exchange line.

7. A structure according to claim 4, comprising means operative incident to extension of a call to a private branch exchange, for producing a test circuit involving the test relay for individual lines, extending from the bank contact in the marker contact bank of the connector allocated to the last line belonging to the private branch exchange and extending to the marker, for controlling the operation of said connector so as to stop rotation of the wipers thereof beyond the bank contact allocated to said last line.

8. A structure according to claim 4, comprising a test relay in said transmission device for checking the condition of the called line after testing thereof by the test relay means in said marker.

References Cited in the file of this patent

UNITED STATES PATENTS

| | | |
|---|---|---|
| 1,203,887 | Lundell | Nov. 7, 1916 |
| 1,251,504 | Goodrum | Jan. 1, 1918 |
| 2,340,555 | Peterson | Feb. 1, 1944 |
| 2,380,950 | Deakin | Aug. 7, 1945 |
| 2,411,525 | Deakin | Nov. 26, 1946 |
| 2,583,782 | Lomax | Jan. 29, 1952 |